(12) United States Patent
Forsyth

(10) Patent No.: US 8,321,344 B2
(45) Date of Patent: Nov. 27, 2012

(54) SELF-SERVICE TERMINAL

(75) Inventor: Gordon A. Forsyth, Perth & Kinross (GB)

(73) Assignee: NCR Corporation, Duluth, GA (US)

( * ) Notice: Subject to any disclaimer, the term of this patent is extended or adjusted under 35 U.S.C. 154(b) by 2677 days.

(21) Appl. No.: 09/826,612

(22) Filed: Apr. 5, 2001

(65) Prior Publication Data

US 2002/0004781 A1 Jan. 10, 2002

(30) Foreign Application Priority Data

Apr. 19, 2000 (GB) .................................. 0009568.7

(51) Int. Cl.
*G06Q 40/00* (2012.01)
(52) U.S. Cl. ............................. 705/41; 705/26.1; 705/77
(58) Field of Classification Search .................... 705/41, 705/26, 771
See application file for complete search history.

(56) References Cited

U.S. PATENT DOCUMENTS

| | | | | |
|---|---|---|---|---|
| 5,557,518 A | * | 9/1996 | Rosen | 705/69 |
| 5,809,143 A | * | 9/1998 | Hughes | 705/77 |
| 5,812,765 A | | 9/1998 | Curtis | |
| 5,897,625 A | | 4/1999 | Gustin et al. | |
| 5,953,504 A | | 9/1999 | Sokal et al. | |
| 6,282,522 B1 | * | 8/2001 | Davis et al. | 705/41 |
| 6,282,618 B1 | * | 8/2001 | Flenley | 711/147 |
| 6,505,171 B1 | * | 1/2003 | Cohen et al. | 705/26 |
| 6,945,457 B1 | * | 9/2005 | Barcelou | 235/380 |

FOREIGN PATENT DOCUMENTS

| | | |
|---|---|---|
| EP | 0791888 | 8/1997 |
| EP | 0883076 | 12/1998 |
| EP | 0932128 | 7/1999 |
| EP | 0 961 249 A1 * | 12/1999 |
| WO | WO 97/14118 | 4/1997 |
| WO | WO 97/45796 | 12/1997 |
| WO | WO 99/21141 | 4/1999 |
| WO | WO 99/28830 | 6/1999 |
| WO | WO 9928830 * | 6/1999 |
| WO | WO 00/22557 | 4/2000 |

\* cited by examiner

*Primary Examiner* — Daniel Felten
(74) *Attorney, Agent, or Firm* — Gregory A. Welte

(57) ABSTRACT

A self-service terminal (12) for connection to a network (30) is described. The terminal (12) has means for receiving payment from a user (58), such as a check deposit module and/or a cash receiving module. The terminal (12) also includes an electronic payment mechanism (82) for creating an electronic financial instrument for paying for an item purchased via the network (30). The electronic financial instrument created is independent of the payment from the user. The terminal (12) may use a credit card for the electronic financial instrument, and the terminal may have a credit card number associated with it, so that the terminal uses this credit card number as part of the electronic financial instrument. The terminal may be an ATM.

8 Claims, 4 Drawing Sheets

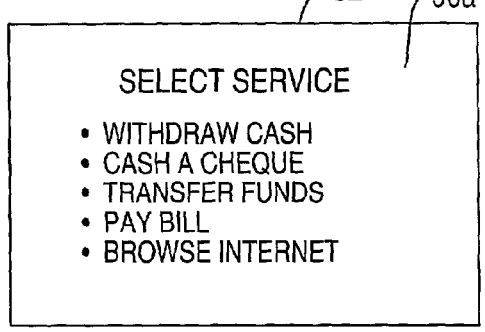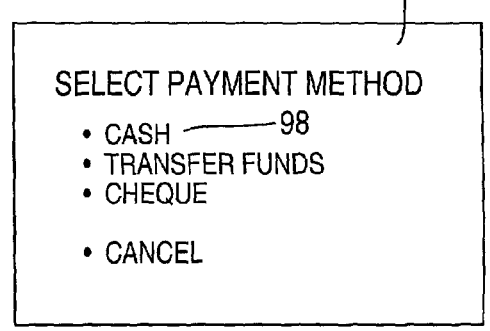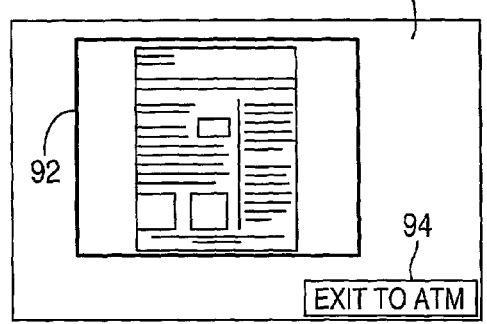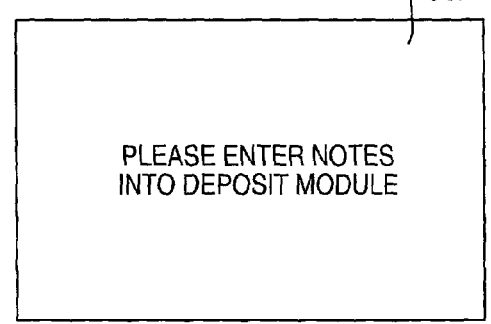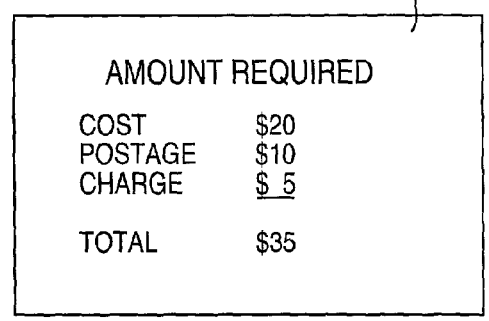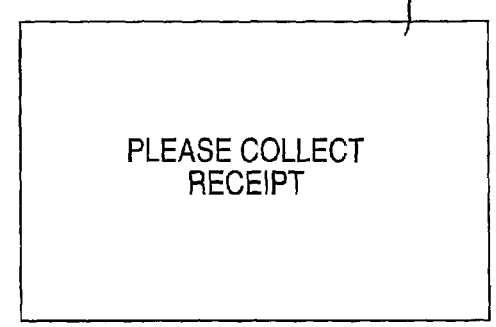

SELF-SERVICE TERMINAL

BACKGROUND OF THE INVENTION

The present invention relates to a self-service terminal (SST), in particular to an SST, such as an ATM (automated teller machine), for purchasing items from a remote merchant via a network. The invention has particular advantages in relation to an Internet-enabled ATM for enabling a user to purchase items offered via the Internet.

An Internet-enabled ATM allows a user of the ATM to browse the Internet. The Internet has become a popular medium for trading, and a huge diversity of items (goods and/or services) are offered for sale or use via the Internet. This enables a merchant (who may be a vendor, a service provider, or such like) to offer his goods and/or services to an enormous number of potential buyers. However, to purchase these goods and/or services, a user is typically requested to provide electronic payment, such as a credit card, a debit card, or such like.

A large number of people do not have access to these forms of electronic payment, for example, because they do not have a bank account, or because they do not have a good credit rating. This limits their ability to purchase items from the Internet.

Other people do not want to enter details of their credit/debit card as they perceive there may be a lack of security in transmitting their card details or because they want to retain anonymity.

SUMMARY OF THE INVENTION

It is among the objects of an embodiment of the present invention to obviate or mitigate one or more of these disadvantages or other disadvantages associated with prior art self-service terminals.

According to a first aspect of the present invention there is provided a self-service terminal for connection to a network, the terminal having means for receiving payment from a user, characterized in that the terminal includes an electronic payment mechanism for creating an electronic financial instrument for paying for an item purchased via the network, where the electronic payment mechanism creates an electronic financial instrument that is independent of the payment from the user.

By virtue of this aspect of the invention a user is able to purchase goods or services from a remote location without the user requiring any electronic payment mechanism such as a credit card, debit card, or such like.

Also by virtue of this aspect of the invention a user is able to make anonymous purchases by inserting cash or credit card details into a SST and by using the electronic payment mechanism provided by the SST. As the electronic payment mechanism creates an electronic financial instrument that is independent of the payment from the user, even if a user inserts credit card details to pay for an item, the electronic financial instrument created by the terminal will not include any of the user's credit card details.

In one embodiment, the network is the Internet. Alternatively, the network may be an Intranet or an Extranet.

The terminal may include a browser or a browser component for enabling a user to browse sites on the network to select an item for purchasing from a merchant.

The payment receiving means may be a check processing module and/or a currency deposit module, or such like.

The electronic financial instrument may be a card payment (such as a credit card, debit card, stored value card, electronic purse, or charge card), an electronic check payment, or such like.

Preferably, the electronic financial instrument is transmitted to a merchant as payment for one or more selected items.

Preferably, the electronic financial instrument does not require any details of a merchant (except a network address) to which payment is to be made. Alternatively, a merchant may be registered with an SST so that the merchant automatically provides the terminal with payment details; and each merchant may use a predefined message for indicating any items purchased and the cost of the items.

Where the terminal uses a credit card for the electronic financial instrument, the terminal may have a unique credit card number associated with it, so that it uses this credit card number as part of the electronic financial instrument. A merchant receiving payment will receive this credit card number. Alternatively, the terminal may be part of a network, and the network may have a single credit card number associated with it, so that each terminal in the network uses the same credit card number.

Where the terminal uses a debit card for the electronic financial instrument, the terminal may have a unique debit card number associated with it, so that it uses this debit card number as part of the electronic financial instrument. Alternatively, the terminal may be part of a network, and the network may have a single debit card number associated with it, so that each terminal in the network uses the same debit card number.

Where the terminal uses an electronic check for the electronic financial instrument, the terminal may have a unique account associated with it, so that it uses this account number as part of the electronic financial instrument. Alternatively, the terminal may be part of a network, and the network may have a single account number associated with it, so that each terminal in the network uses the same account number.

Where the terminal uses a stored value card system, such as the Mondex (trade mark) system, for the electronic financial instrument, each terminal may have a Mondex (trade mark) card located within the terminal for communicating with a Mondex (trade mark) card at a merchant's terminal.

Any other convenient electronic payment mechanism, such as Cybercash (trade mark) may be used to effect payment.

Preferably, the terminal records each electronic financial instrument created and transmits a copy to a database for reconciling with the transactions processed at that terminal. This enables the owner of a terminal to reconcile the electronic financial instruments created with the money received from users.

Preferably, the terminal receives notification, from a Web site operated by a merchant from which the user is to purchase an item, of the amount of money to be paid for purchase of the item. Preferably, the terminal informs the user of the amount of money to be entered to cover payment. In one embodiment, this amount comprises the cost of the item, any postage required, and a surcharge for using the electronic payment mechanism.

Preferably, the terminal prints out a receipt to confirm that the electronic financial instrument has been created and sent.

Preferably, the receipt includes details of any address (which may be an electronic address such as email, or a conventional postal address) to which the purchased item or items are to be delivered. Where the purchased item is electronic (for example, software) it may be delivered to an email address.

According to a second aspect of the present invention there is provided a method of purchasing items using a networked self-service terminal, the method being characterized by the steps of: providing a user with a browser for browsing through merchants connected to the network, where each merchant may offer one or more items for purchase; receiving payment from a user for a selected item to be purchased from a merchant; creating an electronic payment for paying for the selected item, where the electronic payment is independent of the payment from the user; and transmitting the electronic payment to the merchant.

According to a third aspect of the invention there is provided a self-service terminal network, the network comprising a plurality of self-service terminals, characterized in that each terminal includes an electronic payment mechanism for creating financial instruments in response to a request by a user of a terminal, where an owner of the network is liable for payment of the financial instrument.

Preferably, the system includes a store for recording the number of financial instruments created and the value of each financial instrument. The store may be a central repository for the entire SST network. Alternatively or additionally, each terminal may have its own store.

According to a fourth aspect of the present invention there is provided a method of purchasing an item via a self-service terminal, the method comprising the steps of: receiving from a user an indication of an item for purchase using the terminal, receiving from the user a first form of payment for purchasing the item, paying for the item using a second form of payment generated by the terminal.

Preferably, the first form of payment is in the form of physical media, such as cash, a check, or such like. Alternatively, the first form of payment is selected from: a user's credit card, a user's debit card, direct fund transfer, or such like payment.

Preferably, the second form of payment is an electronic payment, such as: electronic check, credit card, debit card, or such like.

The second form of payment may be different to the first form of payment. Even when the second form of payment is the same as the first form of payment, a financial transaction used to effect the second form of payment is different the financial transaction used to effect the first form of payment. Thus, if a user pays using a credit card and the terminal creates a financial instrument having a credit card number, the two transactions have different credit card numbers, and are therefore different transactions.

According to a fifth aspect of the present invention there is provided a method of leasing a payment mechanism to a user of a self-service terminal, the method comprising the steps of: providing an electronic financial instrument for an amount to cover payment of a selected purchase; and requesting from a user sufficient funds to cover the payment, any postage, and a leasing surcharge.

These aspects of the present invention have the advantage that a user is able to purchase an item even though the user does not have any personal electronic payment facility.

BRIEF DESCRIPTION OF THE DRAWINGS

These and other aspects of the present invention will be apparent from the following specific description, given by way of example, with reference to the accompanying drawings in which:

FIGS. 3A to 3H are pictorial representations of a sequence of screens presented to a user by the terminal of FIG. 2 during a typical transaction.

DETAILED DESCRIPTION

Figure 1:
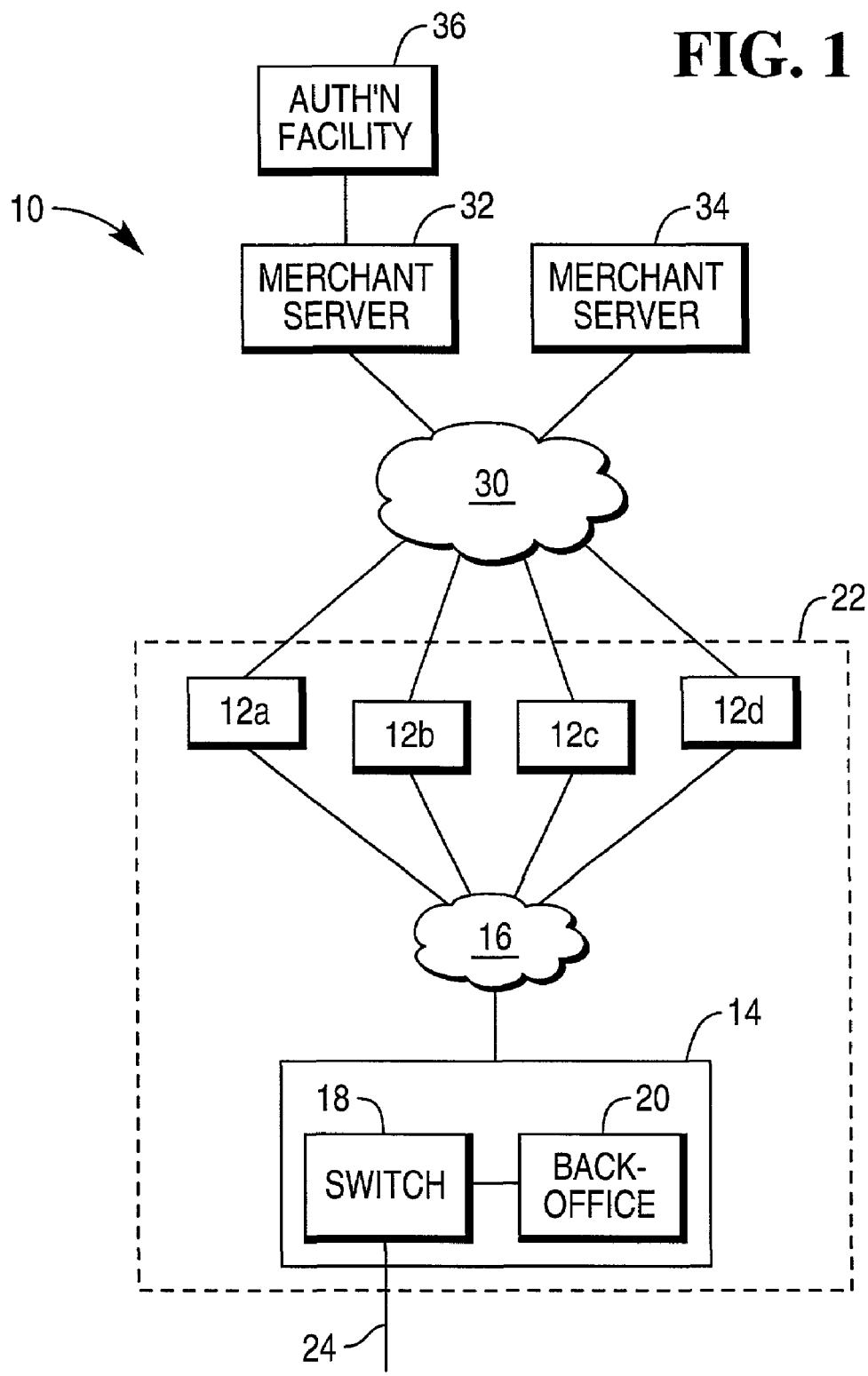
FIG. 1 is a schematic diagram of a self-service terminal system according to one embodiment of the present invention.

Reference is now made to FIG. 1, which shows an SST system 10 in the form of an ATM system. ATM system 10 comprises a plurality of ATMs 12 (four of which, 12a, 12b, 12c, 12d, are shown in FIG. 1) each connected to a financial institution's authorization center 14 via a secure private network 16. The center 14 comprises a switching device 18 and a back-office 20, where the back-office 20 includes an authorization facility.

The ATMs 12, private network 16, and authorization center 20 form an ATM network 22.

In a similar way as for conventional ATM networks, the switching device 18 is used for routing financial transaction authorization requests from the ATMs 12 to the authorization facility in the back-office 20. Switching device 18 is also able to route authorization requests to authorization centers operated by other financial institutions and to financial services companies via switch output 24.

Each ATM 12 is also connected to a public access network 30 in the form of the Internet. As is well known, a huge number of merchant servers are connected to the Internet 30, two of which (32,34) are shown in FIG. 1. An authorization facility 36 used by merchant server 32 is also shown.

Figure 2:
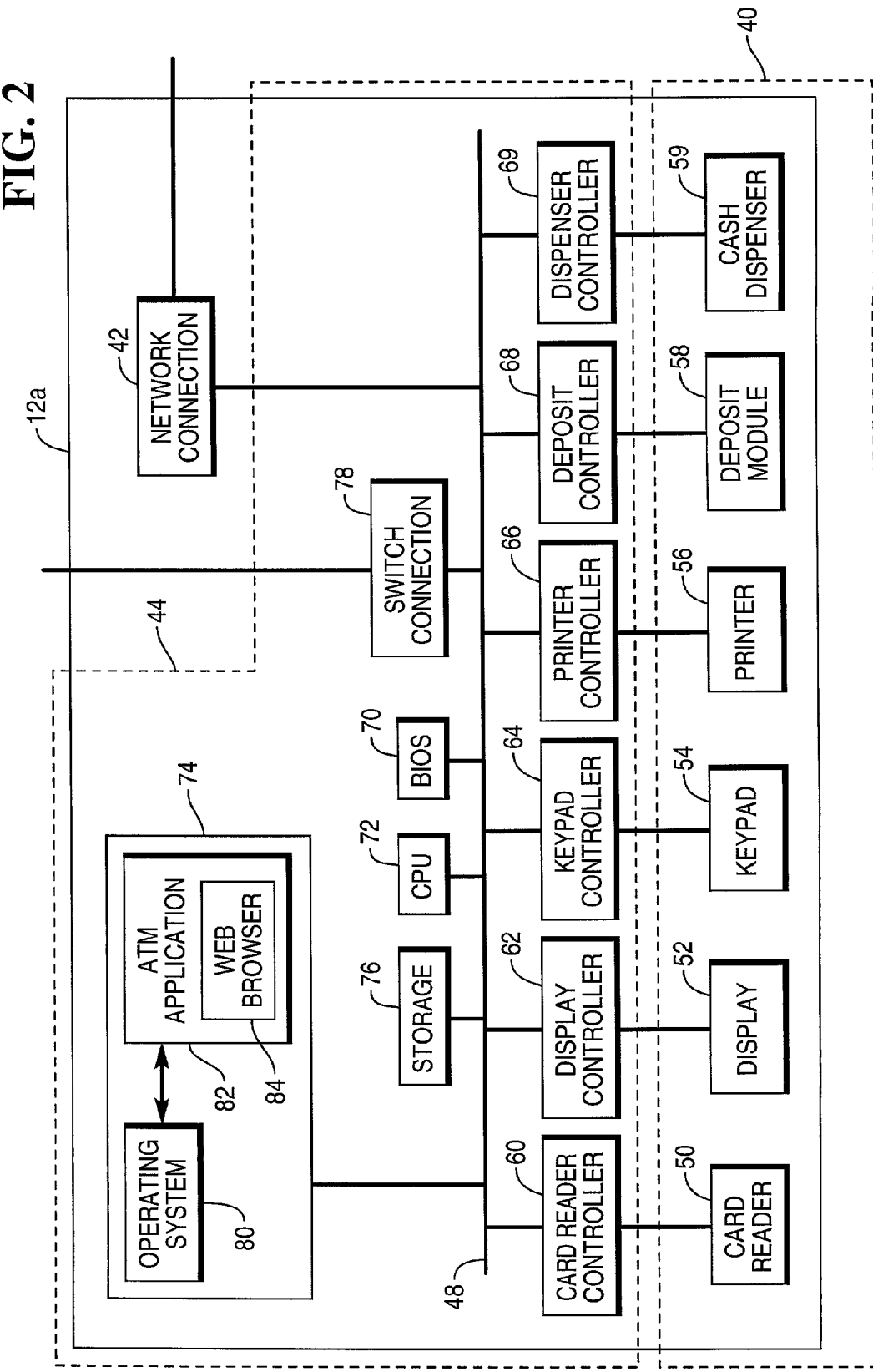
FIG. 2 is a block diagram of a terminal of FIG. 1.

Reference is now made to FIG. 2, which is a block diagram of one of the ATMs 12a of FIG. 1. The ATM 12a comprises a user interface 40, a network connection 42 for accessing the Internet 30, and an ATM controller 44.

The user interface 40 comprises the following user interface elements (peripheral devices): a card reader 50, a display 52, an encrypting keypad 54, a printer 56, a document deposit module 58, and a cash dispenser 59. The document deposit module 58 is able to receive checks and/or bank notes for crediting an account or for paying for services offered at the ATM 12a.

The controller 44 comprises modules for driving the user interface elements 50 to 59, namely: card reader controller 60, display controller 62, keypad controller 64, printer controller 66, document deposit controller 68, and dispenser controller 69. These user interface elements (50 to 59) and associated controllers (60 to 69) are standard modules that are used on conventional ATMs and will not be described in detail herein.

The controller 44 also comprises a BIOS 70 stored in non-volatile memory, a microprocessor 72, associated main memory 74, storage space 76 in the form of a magnetic disk drive, and a dedicated switch connection 78 for connecting the ATM 12a to the authorization center 14 (FIG. 1).

In use, the ATM 12a loads an operating system kernel 80, and an ATM application program 82 into the main memory 74. The ATM application program 82 includes a Web browser 84 in the form of an Internet Explorer (trade mark) browser application (or a sub-component thereof) which is embedded within the ATM application 82. For simplicity, hereinafter the embedded browser application 84 will be referred to as a browser or a Web browser.

The ATM application program 82 is used to control the operation of the ATM 12a. In particular, the ATM application program provides the sequence of screens used in each transaction (referred to as the application flow); monitors the condition of each module within the ATM (state of health monitoring); and provides the electronic payment mechanism for creating an electronic financial instrument.

The term "screen" is used herein to denote the graphics, text, controls (such as menu options), and such like, that are displayed on an SST display; the term "screen" as used herein does not refer to the hardware (for example, the LCD, CRT, or touchscreen) that displays the graphics, text, controls, and such like. Typically, when a transaction is being entered at an SST, a series of screens are presented in succession on the SST display. For example, a first screen may request a user to insert a card, a second screen may invite the user to enter his/her PIN, a third screen may invite the user to select a transaction, and so on.

A typical transaction will now be described from a user's perspective with reference to FIGS. 2 and 3. To initiate a transaction a user touches the display 52.

ATM application program 82 then causes display 52 to present the user with a screen 90a (FIG. 3A) inviting the user to select a transaction and/or service option. In screen 90a (shown in FIG. 3A) the options are: "Withdraw cash", "Cash a check", "Transfer funds", "Pay a Bill", and "Browse the Internet".

If the user selects "Browse Internet" then ATM program 82 launches the Web browser 84, and causes display 52 to present a screen 90b (FIG. 3B) having a Web browser window 92 and an exit option 94 for closing the Web browser window 92 and returning to the ATM application flow.

The user may then navigate through the World Wide Web by touching hyperlinks (or other navigation controls) displayed on the browser window 92. The user may view a Web site associated with a merchant offering items the user wishes to purchase. When the user has selected the item to be purchased, he then selects a "Pay" option on the Web site.

The merchant's server 32 (FIG. 1) sends details of the purchase and the amount required to cover payment and any postage to the browser 84. The ATM application program 82 obtains the amount required, optionally adds a surcharge to this amount and causes display 52 to present the total required to the user on a screen 90c (FIG. 3C).

The ATM 12a causes display 52 to present a screen inviting the user to insert details of a delivery address for the item to be purchased.

The application program 82 then causes display 52 to present a screen 90e (FIG. 3E) inviting the user to choose the method of payment (to the ATM 12a) required; in screen 90e the options are cash, transfer finds, or check, although other payment methods may be offered such as credit card, debit card, or Mondex (trade mark). Screen 90e also gives the user the option of canceling the transaction.

If the user opts to pay by cash (option 98 on screen 90e), the ATM program 82 causes display 52 to present a screen 90f (FIG. 3F) inviting the user to enter bank notes into the deposit module 58 until sufficient funds have been entered.

When sufficient bank notes have been entered, the ATM program 82 causes display 52 to present a screen 90g (FIG. 3G) indicating that the full amount has been paid and that the payment is being transmitted to the merchant's Web server 32.

The ATM program 82 then causes display 52 to present a screen 90h (FIG. 3H) inviting the user to collect a receipt from the receipt printer 56 indicating the cost of the item purchased, the merchant from which it was purchased, the delivery address, the surcharge applied, the date of purchase, and a unique transaction identifier.

Figure 4:
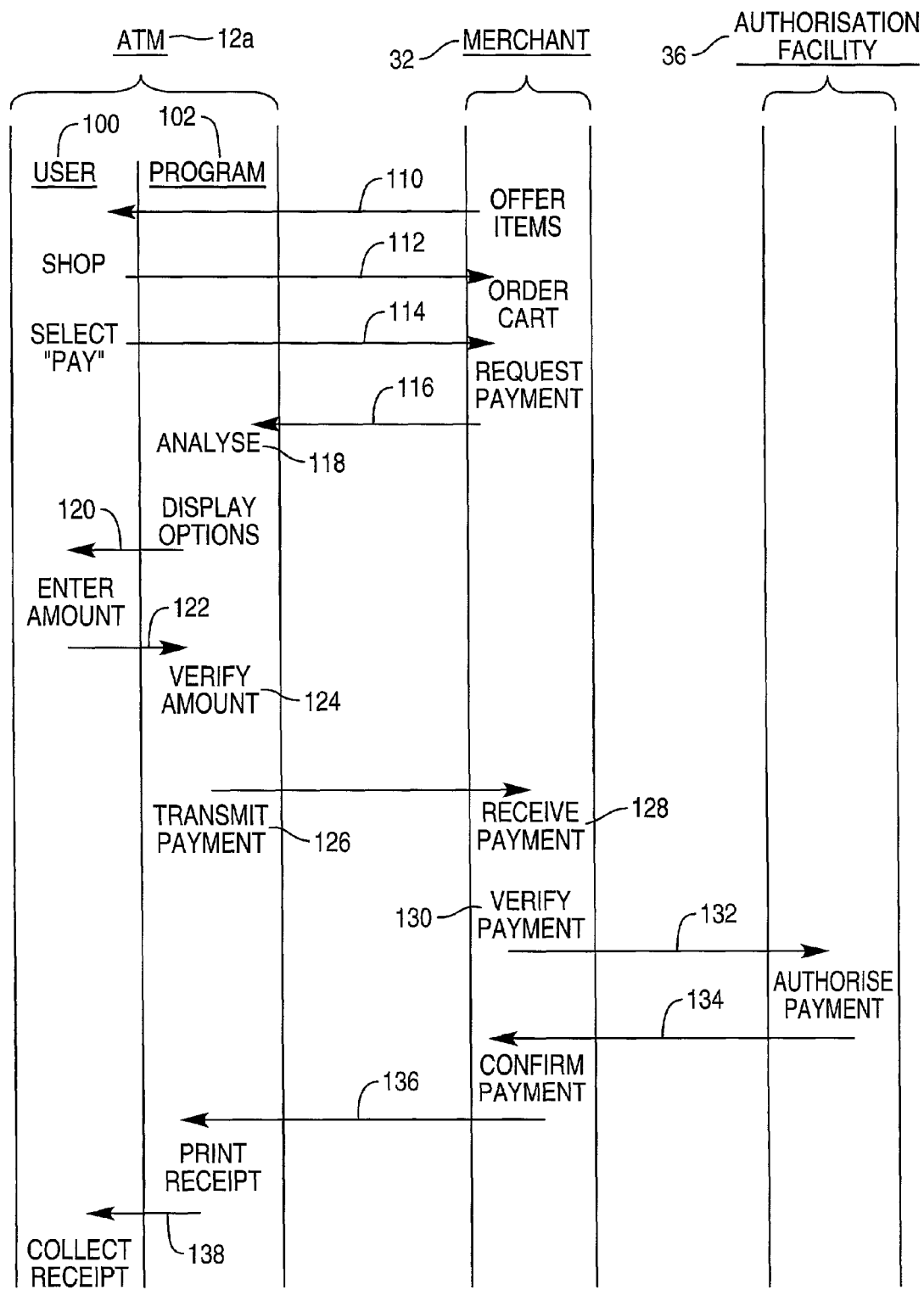
FIG. 4 is a diagram showing the interaction between different elements of the system of FIG. 1.

Reference is now made to FIG. 4, which shows the interaction between the ATM 12a, the merchant's server 32, and the authorization facility 36 used by the merchants server 32 to authorize transactions. The transaction described above with reference to FIGS. 2 to 3, will now be described with reference to FIG. 4, and the corresponding screen in FIGS. 3 is indicated for reference.

The ATM 12a is shown in two parts (100,102), one part (100) relates to the steps taken by a user interacting with the ATM 12a (described above with reference to FIGS. 3), the other part (102) relates to the steps taken by the ATM 12a itself, where these steps may not be apparent to the user.

As the user browses the Internet (screen 90b), he may visit a site hosted by the merchant's server 32. This site may offer the user certain items (step 110). The user may select on or more of these items (step 112), and the Web site adds selected items to a shopping cart. When the user has selected all of the items he wants, he clicks the "Pay" option (step 114).

The merchant's server 32 responds to the "Pay" selection by sending a payment request (step 116) including details of the item or items to be bought, the cost of the item or items, and any postage required. The payment request may also include a request to indicate what payment method will be used to effect payment.

This payment request is intercepted by the ATM 12a, which analyses (step 118) the cost information contained therein. The ATM presents the user (step 120) with details of the cost of the item or items (screen 90c) and any surcharge applied by the ATM 12a.

The user then pays the ATM 12a (step 122) by entering cash into module 58 (screens 90,90f).

The ATM 12a verifies that the correct amount has been entered (step 124), and then creates an electronic financial instrument. In this embodiment, the electronic financial instrument is a credit card payment. The ATM 12a has been assigned a credit card number, and uses this credit card number to purchase the selected items. The ATM 12a records each created financial instrument in a database (in magnetic disk drive 76 (FIG. 2)).

The ATM 12a sends this credit card payment to the merchant's server 32 (step 126) using a secure connection (screen 90g), such as SSL (secure sockets layer), and/or by using S-HTTP.

The merchant server 32 receives the payment (step 128) and verifies (step 130) that the payment is sufficient to cover the cost of the item or items to be purchased. The server 32 then transmits the credit card payment (step 132) to the authorization facility 36 (FIG. 1) for authorizing. The facility 36 authorizes the transaction and transmits the authorization (step 134) to the server 32.

The merchant server 32 then initiates dispatch of the purchased item or items and confirms purchase (step 136) to the ATM 12a.

The ATM 12a receives this confirmation and prints a receipt (step 138) including details of the transaction, as described with reference to FIG. 3H (screen 90h).

The user then collects the receipt as proof of purchase.

At the end of each day, the ATM 12a may access the database of financial instruments created that day (from disk drive 76), and may upload details of these financial instruments to the authorization center 14 for reconciling.

It will be appreciated that the above embodiment has the advantage that a user can purchase items advertised via the Internet without having any electronic payment mechanism of their own. A user can, in effect, lease a payment mechanism from an SST to enable him/her to purchase the desired item.

Various modifications may be made to the above described embodiment within the scope of the invention, for example, in other embodiments, the application flow may differ from that described above. In other embodiments, the user may select a different method of payment (that is, a different first form of payment), for example, credit card, check, debit card, or such like. In other embodiments, the ATM may only allow a user to access certain Web sites. In other embodiments, the terminal may use a different second form of payment, such as electronic check, debit card, or such like. The ATM may use a special electronic payment system such as Cybercash (trade mark), or may use a Secure Electronic Transaction (SET) model. In other embodiments, the merchant may not authorize every (or any) transaction using on-line authorization. In other embodiments, step 130 (FIG. 4) may not occur, as the merchant may complete a credit card financial instrument by adding the total amount payable to the credit card details. In other embodiments, the ATM may print a receipt as soon as payment has been submitted to the merchant's Web server. In other embodiments, the document deposit module may be replaced by two modules: a check processing module and a bank note receiving module In other embodiments, different shopping models may be supported to that described above, for example, if a user decides to purchase an item from a Web site then the user may select the item and indicate the method of payment to be used, such as a credit card; the ATM may have a notice informing users of the payment methods that are available using the ATM, such as credit card, debit card, electronic check, and such like; the user can then choose a payment method that is both accepted by the merchant and available at that ATM. In other embodiments, the terminal may store (locally or remotely) a personal wallet for each authorized user, so that if or when the user is identified, the terminal provides the user with his/her personal wallet. The wallet may include details of the address to which any purchased items should be sent. In other embodiments, network 30 may be an Intranet and each merchant may be authorized to offer goods and/or services via the Intranet. In other embodiments, a different Web browser or browser component may be used, such as HotJava (trade mark), Netscape Communicator, or such like. In other embodiments, the terminal may only allow purchases up to a pre-determined price limit.

What is claimed is:

1. A self-service terminal which comprises an Automated Teller Machine, ATM, and which is operated by an operating party, for connection to a network, the terminal comprising:
   a) means for receiving payment from a user, including payment wherein the user selectively pays via cash, credit card, electronic card, or debit card; and
   b) means for delivering a third party payment to a third party or merchant, who is different from the user and different from the operating party, which third party payment
      i) is made using a credit card assigned to the terminal,
      ii) does not allow the third party to learn the identity of the user, and
      iii) does not allow the third party to learn an account number of the user.

2. A terminal according to claim 1, further comprising a browser for enabling a user to browse sites on the network to select an item for purchasing from a merchant.

3. A method of operating self-service terminals in a self-service terminal network, the method comprising the steps of:
   a) at a self-service terminal, providing a user with a browser for browsing through merchants connected to the network, wherein each merchant offers one or more items for purchase;
   b) receiving payment via a first credit card number from a user for a selected item to be purchased from a merchant;
   c) transmitting payment to the merchant via an account number which is different from the first credit card number, which payment
      i) prevents the merchant from learning identity of the user and
      ii) prevents the merchant from learning the first credit card number.

4. A method of purchasing items using an Automated Teller Machine, ATM, comprising the steps of:
   a) providing a web browser to a user of the ATM for browsing web pages of merchants;
   b) receiving payment via a first credit card from the user for a purchase from a selected merchant; and
   c) using a credit card account assigned to the ATM, transmitting payment to the selected merchant.

5. Method according to claim 4, and further comprising:
   d) using the account to make payment to the selected merchant
      (i) without identifying the user to the merchant, and
      (ii) without disclosing an account number of the user to the merchant.

6. Terminal according to claim 1, in which the user makes payment using (1) a credit card having an account number or (2) an account having an account number and no account number of the user is disclosed to the third party.

7. Terminal according to claim 6, in which the credit card of the terminal has an account number T, and no account number of the user is identical with account number T.

8. Terminal according to claim 3, in which the account number which is different from the first credit card number represents a credit account of the terminal.

* * * * *